(12) United States Patent
Soh

(10) Patent No.: US 6,775,224 B1
(45) Date of Patent: Aug. 10, 2004

(54) ROTOR BALANCER AND DISK DRIVE HAVING ROTOR BALANCER

(75) Inventor: Wook Young Soh, Suwon (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/565,373

(22) Filed: May 5, 2000

(30) Foreign Application Priority Data

May 8, 1999 (KR) ........................................ 1999/16454
Sep. 14, 1999 (KR) ........................................ 1999/19702

(51) Int. Cl.⁷ ............................................. G11B 23/00
(52) U.S. Cl. ..................................................... 369/263
(58) Field of Search ................................. 369/263, 264, 369/265, 270, 271, 266; 310/67 R; 73/460; 360/98.07, 99.04, 99.08

(56) References Cited

U.S. PATENT DOCUMENTS

| | | | | |
|---|---|---|---|---|
| 5,956,315 A | * | 9/1999 | Sawai et al. ................ | 369/270 |
| 6,005,311 A | * | 12/1999 | Matsushima ................. | 310/51 |
| 6,005,749 A | * | 12/1999 | Ikuta et al. ............... | 360/99.12 |
| 6,038,206 A | * | 3/2000 | Mukawa ..................... | 369/271 |
| 6,125,098 A | * | 9/2000 | Osawa ....................... | 369/266 |
| 6,198,715 B1 | * | 3/2001 | Kouno et al. ............... | 369/263 |
| 6,219,328 B1 | * | 4/2001 | Kume et al. ................ | 369/269 |
| 6,243,351 B1 | * | 6/2001 | Huang ........................ | 369/263 |
| 6,249,505 B1 | * | 6/2001 | Miyamoto et al. .......... | 369/266 |
| 6,281,608 B1 | * | 8/2001 | Matsushima ................. | 310/51 |
| 6,295,269 B1 | * | 9/2001 | Takeuchi et al. ........... | 369/263 |
| 6,330,220 B1 | * | 12/2001 | Shiga et al. ............... | 369/263 |
| 6,333,912 B1 | * | 12/2001 | Sohn ......................... | 369/263 |
| 6,363,048 B1 | * | 3/2002 | Wu et al. ................... | 369/271 |
| 6,452,896 B1 | * | 9/2002 | Song ......................... | 369/263 |

* cited by examiner

*Primary Examiner*—Allen Cao
(74) *Attorney, Agent, or Firm*—Birch, Stewart, Kolasch & Birch, LLP

(57) ABSTRACT

A rotor balancer and a disk driver having the rotor balancer are disclosed. The rotor balancer simplifies a construction of an auto balancing unit for automatically correcting a rotation unbalance occurring when a disk is rotated and of a mounting unit for accurately mounting the disk. Further, the rotor balancer reduces noise and vibration. The rotor balancer includes a ball case installed at a rotor for rotating a rotation member. The ball case has a circular racing space of which racing faces have different friction coefficients. The disk driver, having the rotor balancer, includes an insert unit on a turntable which is inserted into a central hole of the disk. A plurality of mounting spring pieces are formed at the insert unit and made of an elastic material so as to elastically support the disk, when it is mounted, so that the disk can be mounted accurately and firmly.

17 Claims, 5 Drawing Sheets

ROTOR BALANCER AND DISK DRIVE HAVING ROTOR BALANCER

BACKGROUND OF THE INVENTION

1. Field of the Invention

The present invention relates to a rotor balancer and a disk drive or driver having the rotor balancer, and more particularly, to a rotor balancer and a disk drive or driver having the rotor balancer which is capable of simplifying a construction of an auto balancing unit for automatically correcting a rotation unbalance occurring when a disk is rotated and a mounting unit for accurately mounting the disk, while reducing a noise and a vibration.

2. Description of the Background Art

Generally, when a rotor for rotating a rotation-object member is rotated, a rotation unbalance may occur from various causes. In order to remove such rotation unbalance problem, a rotor balancer is provided.

The rotor balancer is used for various devices. In the following description, the rotor balancer is taken an example for a disk driver for recording and reproducing a signal on and from a disk such as a CD or a DVD.

Recently, as the disk driver is designed to rotate at a high speed, a disk rotation unbalance problem occurs when a disk is rotated at a high speed.

Such rotation unbalance of the disk makes it difficult to accurately reproduce a signal recorded from the disk or to accurately record a signal on the disk.

The rotation unbalance of the disk is mostly caused due to unbalance of the disk itself (in case that there is a mass eccentricity) when the disk is fabricated, and especially it comes as a more serious problem when the disk is rotated at a high speed.

In addition, the rotation unbalance may occur in case that the disk is not accurately mounted on a turntable.

In order to solve the rotation unbalance of the disk, a balancer is provided to a mounting unit on which the disk is mounted, to a clamp for holding the disk, or to a spindle motor for rotating the disk.

A rotor balancer used for a disk driver in accordance with a conventional art will now be described with reference to the accompanying drawings.

Figure 1:
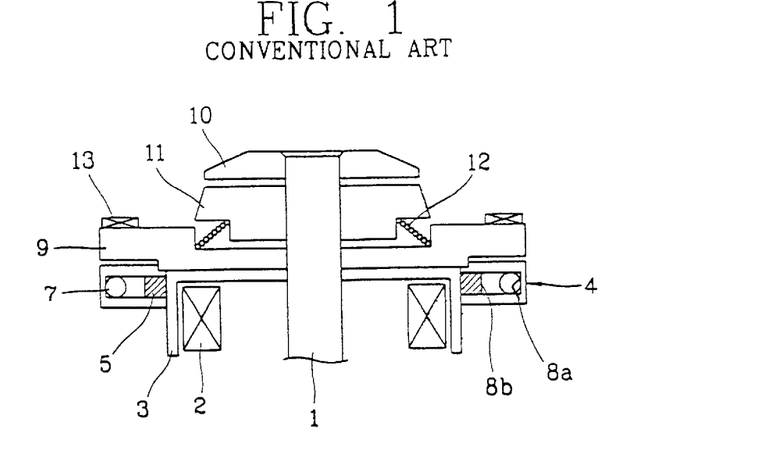
FIG. 1 is a sectional view showing a construction of a disk driver having a rotor balancer in accordance with a conventional art.

FIG. 1 is a sectional view showing a construction of a disk driver having a rotor balancer in accordance with a conventional art.

As shown in the drawing, at the lower portion of the rotational shaft 1, there are provided a spindle motor 3 for rotating a disk (not shown) by providing a rotor 2 that is rotated along with a rotational shaft 1 and an auto balancing unit for correcting a rotation unbalance when the disk (not shown) is rotated at the side of the spindle motor 3.

The auto balancing unit includes a ball case 4 having a circular racing space, a magnet 5 having a predetermined size positioned at one side in the ball case 4, and a plurality of metallic balls for correcting a rotation unbalance when the disk is rotated positioned at the space 6 between the inner circumferential surface of the ball case 4 and the magnet 5.

The magnet 5 normally serves to prevent the ball 7 from moving freely in the space 6.

The inner circumferential surface of the ball case 4 becomes the outer racing face 8a on which the ball 7 travels, and the surface of the magnet 5 becomes the inner racing face 8b on which the ball 7 travels.

Meanwhile, at the upper portion of the rotational shaft 1, there is provided a mounting unit including a turntable 9 on which a disk (not shown) is mounted, an insert portion formed as an insert cone 10 installed at the upper end of the rotational shaft 1, for accurately fixing the disk (not shown), a mounting ring 11 installed between the turntable 9 and the insert cone 10, and a spring 12 for elastically supporting the mounting ring 11 upwardly.

A friction member 13 is installed at a circumferential portion at the upper surface of the turntable 9, to which a lower surface of the disk is adhered so that the disk is prevented from arbitrarily moving on the turntable 9.

The insert cone 10 and the mounting ring 11 to which a hole (not shown) of the disk is inserted is formed of which the upper circumferential portions are sloped to a predetermined degree, to thereby facilitate insertion of the disk.

The outer diameter of the insert cone 10 is approximately 14.96 mm~14.99 mm. For reference, the inner diameter of the central hole of the general disk is approximately 15 mm~15.1 mm.

Accordingly, there is a gap of approximately 10~40 $\mu$m between the inner diameter of the hold of the disk and the outer diameter of the insert cone 10, by which, when the disk is inserted to the insert cone 10 and is clamped by a clamp (not shown), since the disk may be mounted on the turntable 9 in an eccentric state, the disk mounting unit is installed to remove the eccentricity and the disk is centered.

Namely, centering of the disk is made in a manner that in a state that the disk is inserted into the insert cone 10, the mounting ring 11 is upwardly supported by the spring 12 and the claim (not shown) presses down the disk.

The operation of the disk driver having the rotor balancer of the conventional art constructed as described above will now be explained with reference to FIGS. 2A and 2B.

Figure 2A:
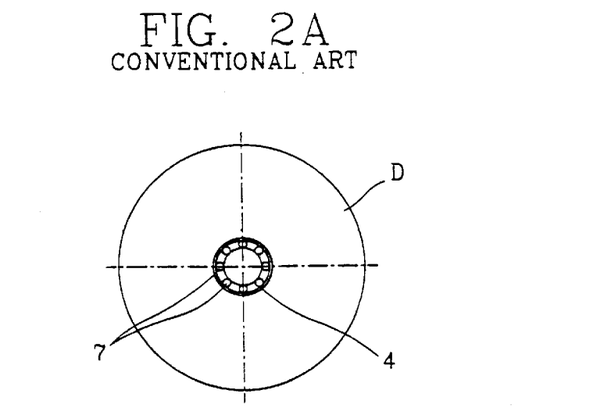
FIG. 2A is a view showing that balls are aligned for a disk without mass eccentricity in an auto balancing unit of a rotor balancer in accordance with the conventional art.

FIG. 2A is a view showing how the balls are aligned for a disk without a mass eccentricity in an auto balancing unit of a rotor balancer, in accordance with the conventional art. FIG. 2B is a view showing how the balls are aligned to compensate for a mass eccentricity in the auto balancing unit of the rotor balancer, in accordance with the convention art.

Figure 2B:
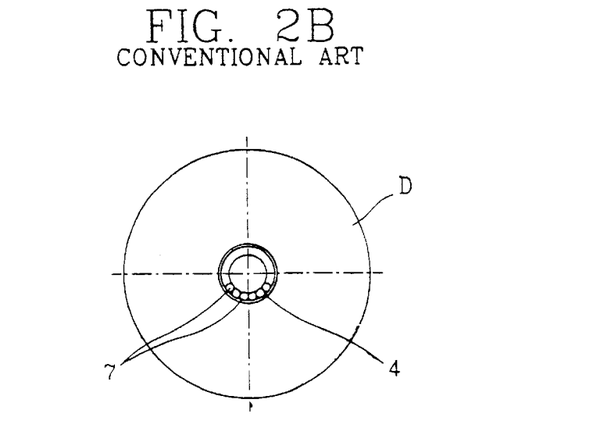
FIG. 2B is a view showing that balls are aligned to compensate mass eccentricity in the auto balancing unit constructing the rotor balancer in accordance with the conventional art.

That is, as shown in FIG. 2B, for a disk 'D' having the mass eccentricity, the balls 7 are collected at one side of the space in the ball case 4, correcting the mass eccentricity. FIG. 2A shows a disk 'D' without mass eccentricity. In this case, the balls 7 are evenly aligned in the space 6 of the ball case 4.

Meanwhile, in case where the disk driver is used vertically, there is following problems due to the gravity force working on the ball 7.

Namely, in case that the disk driver is vertically stood for use, auto balancing, which is however technically difficult, should be favorably made and the balls 7 should be auto-aligned at an early stage.

The auto-alignment refers to a state that the balls 7 are mostly positioned at the outer racing face 8a of the space 6 by virtue of centrifugal force of the spindle motor 3, thereby maintaining balance.

Generally, in order to have a desirable auto balancing, the outer racing face 8a on which the ball 7 travels should have good asperity, concentricity and circularity, by which friction coefficient between the ball 7 and the outer racing face 8a should be minimized.

Meanwhile, in order to stabilize the ball 7 at an early stage, friction coefficient between the ball 7 and the outer racing face 8a should be great so that the disk driver may overcome the gravity force applied to the ball 7 to push up the ball 7 even in its vertically stood-up state.

Therefore, in the conventional art, due to the mutually contradictory characteristics in the auto balancing of the disk driver and the stabilization of the ball, designing was made by sacrificing either one of the two characteristics.

Resultantly, since vibration reduction absolutely affecting the basic capacity of the disk driver takes the priority for designing, the ball balancing is inevitably delayed, so that auto balancing is not made or incompletely made, causing vibration and noise.

Thus, in order to solve the problem, another method is adopted which will now be described with reference to FIGS. 3A and 3B.

Figure 3A:
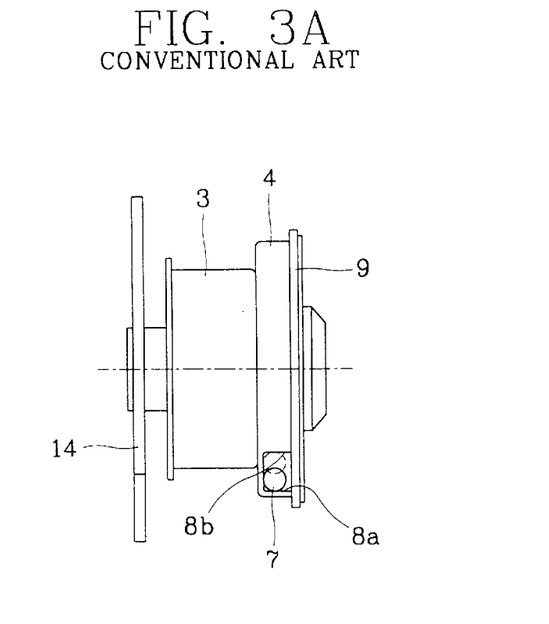
FIG. 3A is a partial sectional view showing a construction of an auto balancing unit provided with a protrusion for pushing up a ball in a state that a disk driver is vertically stood up in accordance with a conventional art.
Figure 3B:
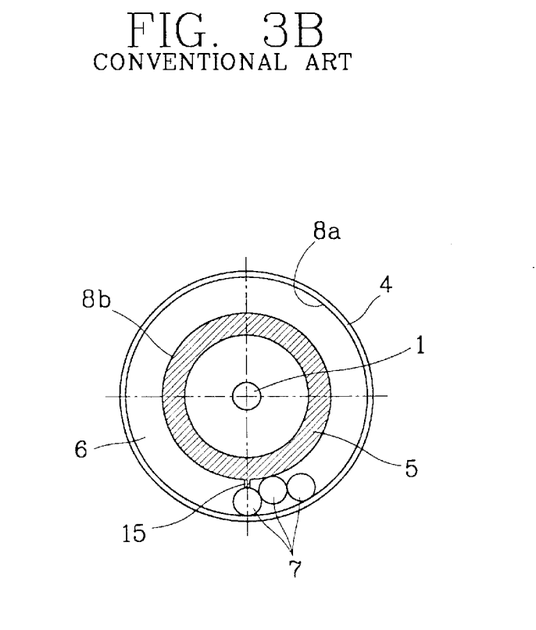
FIG. 3B is a plan sectional view showing a construction and an operation of the auto balancing unit of FIG. 3A in accordance with the conventional art.

FIG. 3A is a partial sectional view showing a construction of an auto balancing unit provided with a protrusion for pushing up a ball in a state that a disk driver is vertically stood up in accordance with a conventional art, and Figure is a plan sectional view showing a construction and an operation of the auto balancing unit of FIG. 3A in accordance with the conventional art.

As shown in the drawings, in a state that the disk driver installed on a substrate 14 is vertically stood up, a protrusion 15 for pushing up the ball 7 is formed on the racing face of the magnet 5, that is, on the inner racing face 8b.

In other words, there is a gap between the inner racing face 8b and the outer racing face 8a on which the ball 7 travels in a state that the balls 7 are positioned. Referring to FIG. 3B, if a ball 7 is inserted between its front-side ball and its back-side ball and pushed toward the inner racing face 8b, it would contact the protrusion 15 and be bounced up by the protrusion 15, thereby making auto balancing even at a low speed.

In this respect, once the ball 7 is bounced up, it is continuously rotated in a state that it is aligned by the centrifugal force.

However in this method, the most critical problem is a noise generated when the ball 7 is bounced up by the protrusion 15.

That is, though the noise caused due to the unbalance of the ball 7 was solved, but another noise is generated which is irregular and uncomfortable.

Another problem is that as the ball 7 collides with the protrusion 15 repeatedly, the ball 7 is damaged, and as the ball pushed up by the protrusion 15 applies an impact onto the outer racing face 8a, the surface of the ball is damaged so that its balancing performance is degraded.

In addition, in case that the protrusion 15 that pushes up the ball 7 is used for a long time, it is damaged by the impact, failing to exercise its original capacity as originally designed, so that a reliability is degraded.

Moreover, since the mounting unit of the disk in accordance with the conventional art has a structure that the mounting ring 11 is separately installed on the turntable 9 and supported by the spring 12, if its assembly is not accurate or if an impact is applied to the disk driver, the assembling is easily distorted, degrading a reliability of its operation.

Furthermore, in the conventional art, the central portion of the turntable 9 is collapsed for installing the mounting ring 11, which restricts the space for installation of the ball case 4, so that the outer diameter of the ball case 4 is almost the same as that of the turntable 5. In this case, since an optical pick-up unit that moves in the radial direction at the lower surface of the disk is readily collided with the ball case 4, it is very difficult to install the ball case 5.

SUMMARY OF THE INVENTION

Therefore, an object of the present invention is to provide a rotor balancer and a disk driver having the rotor that is capable of simplifying a construction of an auto balancing unit for correcting a rotation unbalance when a rotation member is rotated and a mounting unit on which the rotation member is mounted, and of reducing a noise and a vibration.

To achieve these and other advantages and in accordance with the purposed of the present invention, as embodied and broadly described herein, there is provided a rotor balancer including a ball case installed at a rotor for rotating a rotation member and having a circular racing space of which a racing face has different friction coefficients; and a balancing member moved on the facing face of the racing space to automatically correcting unbalance caused when the rotation member is rotated.

In the above rotor balancer of the present invention, as to the racing face of the racing space, the inner racing face near the rotation center of the rotation member has a greater friction coefficient than that of the outer racing face distant from the rotation center.

In the above rotor balancer of the present invention, asperity of the inner racing face is more than 0.7 $\mu$m In the above rotor balancer of the present invention, the balancing member refers to a plurality of metallic ball.

In the above rotor balancer of the present invention, the rotor refers to a turntable on which a disk is mounted in a disk driver for recording/reproducing a signal on and from the disk.

In the above rotor balancer of the present invention, the rotor refers to a motor for providing power for rotating the disk in the disk driver for recording/reproducing a signal on and from the disk.

In the above rotor balancer of the present invention, the rotor refers to a clamper for rotatably fixing the disk when the disk is mounted on the turntable in the disk driver for recording/reproducing a signal on and from the disk.

In the present invention, the disk driver for recording/reproducing a signal on and from the disk has the rotor balancer.

In the present invention, the rotor balancer is provided at the turntable on which the disk is mounted.

In the present invention, on the turntable, there are provided an insert unit into which a central hole of the disk is inserted; and a plurality of mounting spring pieces formed at the insert unit and made of an elastic material as well as having an elastic form so as to elastically support the disk when it is mounted, so that the disk can be mounted accurately and firmly.

In the present invention, the insert unit is integrally formed with the turntable.

In the present invention, the insert unit is separately formed with respect to the turntable.

In the present invention, the mounting spring pieces are formed around the insert unit.

In the present invention, a circle formed by a line formed by a line connecting the outer periphery of the plurality of mounting spring pieces is greater than the diameter of the central hole of the disk to a predetermined degree, so that the disk is inserted into the insert unit by elastically deforming the mounting spring pieces.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 4:
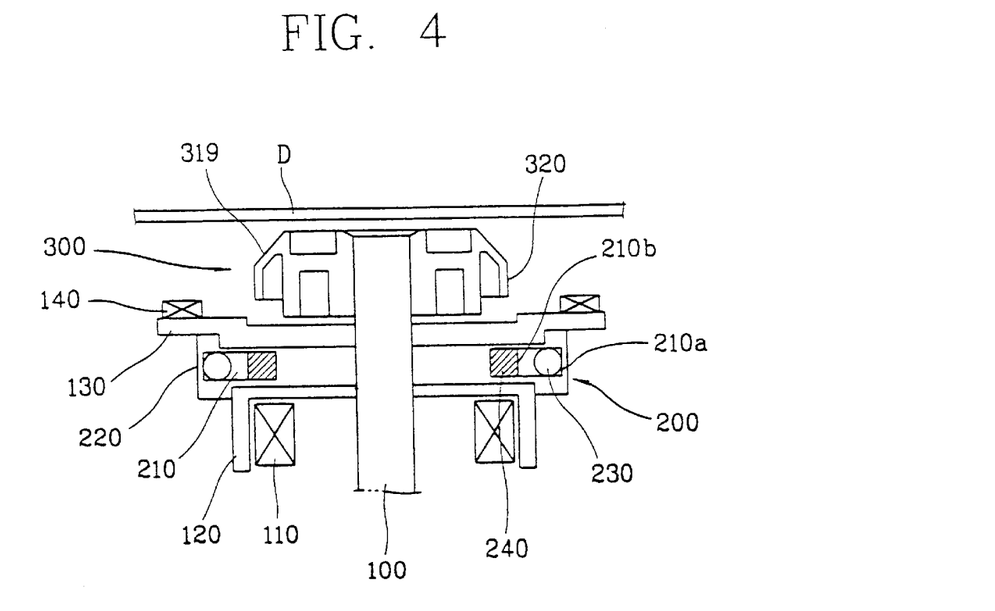
FIG. 4 is a front sectional view showing a disk driver having a rotor balancer in accordance with one embodiment of the present invention.
Figure 5:
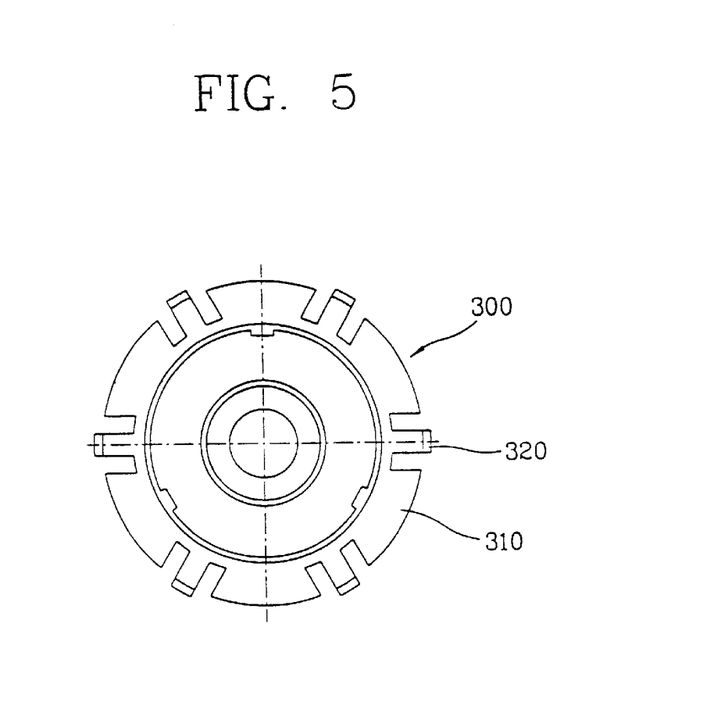
FIG. 5 is a plan view of the disk driver having a mounting unit of the rotor balancer in accordance with one embodiment of the present invention.

FIG. 4 is a front sectional view showing a disk driver having a rotor balancer in accordance with the present invention, and FIG. 5 is a plan view of the disk driver having a mounting unit of the rotor balancer in accordance with the present invention.

As shown in the drawings, at the lower portion of the rotational shaft 100, a spindle motor 120 having a rotor 110 rotated along with the rotational shaft 100 is provided to rotate a disk 'D', and an auto balancing unit 200 is positioned on the spindle motor 120 to correct a rotation unbalance of the disk. At the upper portion of the rotational shaft 100, there are provided a turntable 130 on which the disk 'D' is mounted, a friction member 140 positioned at the circumferential portion of the upper surface of the turntable 130, on which the lower surface of the disk 'D' is adhered so that the disk 'D' is not moved on the turntable 130, and the mounting unit 300 installed on the upper end of the rotational shaft 100 for accurately fixing the disk 'D' on the turntable 130.

The auto balancing unit 200 and the mounting unit 300 constructing the rotor balancer of the disk driver of the present invention will now be described in detail.

First, the auto balancing unit 200 includes a ball case 220 having a circular racing space 210, a balancing member formed of a plurality of balls 230 positioned in the racing space 210 and traveling for balancing of a rotated disk; and a magnet 240 installed in the inner circumferential surface of the racing space 210 of the ball case 220.

Here, the outer racing face of the racing space 210 in which the ball 230 is positioned becomes the outer racing face 210a where the ball travels, while the racing face of the magnet 240 becomes the inner racing face 210b on which the ball 230 travels. The magnet 240 normally serves to restrain the ball 230 from moving freely in the racing space 210.

For reference, on the basis of the rotation center of the rotation of the spindle motor 120, the side near the rotation center is referred to as the inner side, while the side far from the rotation center is referred to as the outer side.

In the auto balancing unit 200 of the present invention, the outer racing ace 210a and the inner racing face 210b of the space 210 are formed with different surface asperity, so that the friction coefficient between the bail 230 and he racing faces 210a and 210b is different according to each racing face 210a and 210b.

Here, the outer racing face 210a should have a small friction coefficient so hat the auto balancing can be easily made.

That is, the outer racing face 210a is formed to have an optimum condition of concentricity and circularity as well as having a good asperity.

By doing that, when the ball 230 travels on the outer racing face 210a, the friction resistance between the ball and the outer racing face 210a is minimized.

Meanwhile, the asperity of the inner racing face 210b is relatively worse than that of the outer racing face 210a, so that the friction resistance between the ball 230 and the inner racing face 210b becomes great and the ball 230 is well pushed up while overcoming the gravity force applied thereto in case that the disk 'D' is vertically stood up, and particularly, the ball 230 quickly aligned at a low speed to accomplish an auto balancing at an early stage.

In that manner, the friction between the ball 230 and the inner racing face 210b becomes great by worsening the asperity of the inner racing face 210b more than that of the outer racing face 210a, and in this respect, the asperity of the inner racing face 210b is preferably more than 0.7 μm.

Here, in the space 210 of the ball case 220, the faces other than the outer racing face 210a and the inner racing face 210b, that is, the upper and lower faces of the inner space connecting the outer racing face 210a and the inner racing face 210b, preferably have the same condition of asperity as that of the outer racing face 210b.

In the above description, the auto balancing unit 200 is provided at the turntable 130, but it may be installed at the spindle motor 120 or at the clamp (not shown) for holding the disk at the turntable 130.

Meanwhile, as shown in FIGS. 4 and 5, the mounting unit 300 of the rotor balancer in accordance with the present invention includes an insert cone 310, or an insert portion, inserted into the central hole of the disk, and a plurality of mounting spring pieces 320 integrally or separately formed at the periphery of the insert cone 310.

The mounting spring piece 320 is formed to be protrusive to a predetermined degree from the margin of the insert cone 310, has elasticity and is formed along with the insert cone 310 by molding.

Comparative relationships between the inner diameter of the hole formed at the center of the disk 'D', the outer diameter of the insert cone 310, and the outer diameter of a circle formed by a line connecting the outer circumference of the mounting spring piece 320 are as follows.

The diameter of the hole of the disk 'D' is typically 15~15.1 mm, the diameter of the insert cone 310 is typically 14.96~14.99, and the diameter of the mounting spring piece 320 is typically 15.1±0.3 mm.

Figure 6:
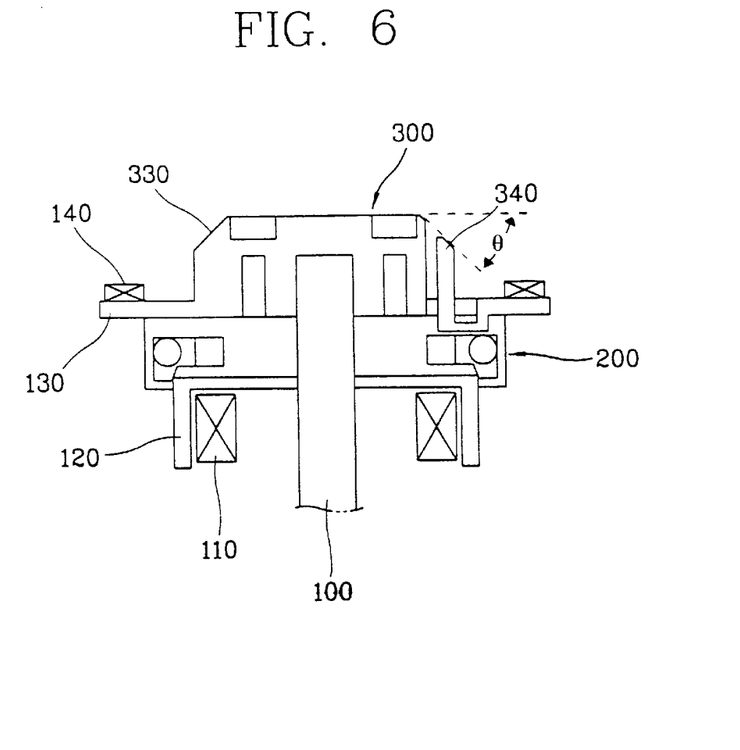
FIG. 6 is a front sectional view showing a disk driver having a rotor balancer in accordance with another embodiment of the present invention.
Figure 7:
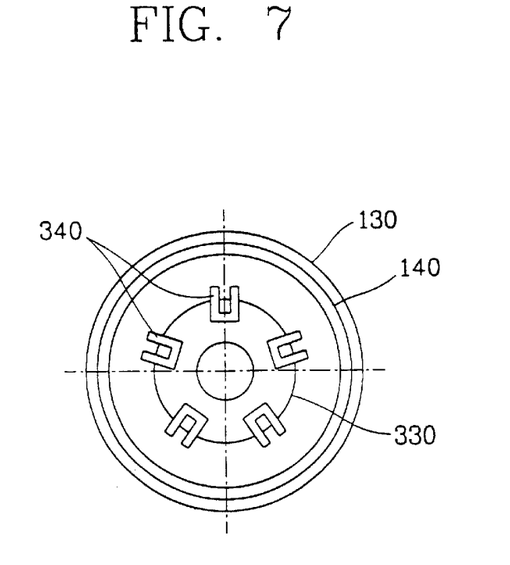
FIG. 7 is a plan view of the disk driver having a mounting unit of the rotor balancer in accordance with another embodiment of the present invention.

FIG. 6 is a front sectional view showing a disk driver having a rotor balancer in accordance with another embodiment of the present invention, and FIG. 7 is a plan view of the disk driver having a mounting unit of the rotor balancer in accordance with another embodiment of the present invention.

Descriptions for the same elements are omitted, and a mounting unit 300 in accordance with another embodiment of the present invention will now be described.

The mounting unit 300 of the rotor balancer in accordance with another embodiment of the present invention includes an insert cone 330 integrally formed with the turntable 130 in a cylindrical form, of which an upper circumferential portion is sloped to facilitate an insertion of the disk 'D' and a lower end portion is inserted into the central hole of the disk 'D'. A plurality of mounting spring pieces 340 are formed along the periphery of the insert cone 330.

As shown in FIG. 6, the mounting spring piece 340 is formed extending from the turntable 130. The upper end of the mounting spring piece 340 is formed in an extended line (angle θ of FIG. 6) from the sloped portion of the upper surface of the insert cone 330, being a part of the insert cone 330 by itself.

The operation of the disk driver having the rotor balancer consisting of the auto balancing unit 200 and the mounting unit 300 of the present invention constructed as described above will now be explained with reference to FIGS. 8 and 9.

Figure 8:
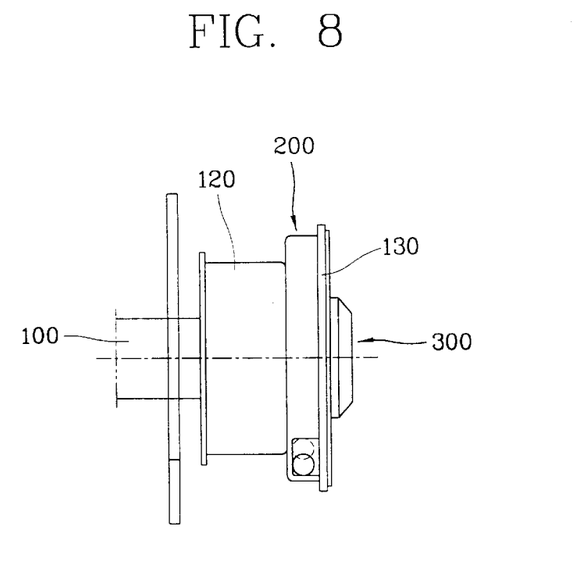
FIG. 8 is a plan sectional view showing a state that the disk driver having the rotor balancer is vertically stood up in accordance with the present invention.
Figure 9:
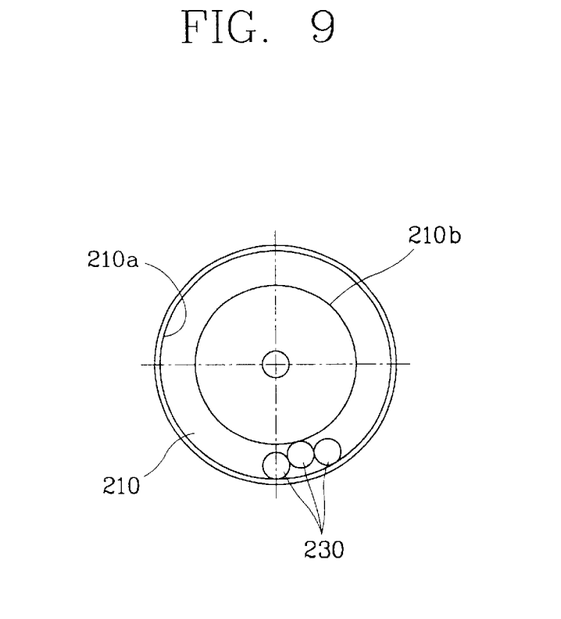
FIG. 9 is a plan sectional view for showing an operation of an auto balancing unit in the state of FIG. 8 in accordance with the present invention.

FIG. 8 is a plan sectional view showing a state that the disk driver having the rotor balancer is vertically stood up in accordance with the present invention, and FIG. 9 is a plan sectional view for showing an operation of an auto balancing unit in the state of FIG. 8 in accordance with the present invention.

First, in order to mount the disk 'D' on the turntable 130, the hole of the disk 'D' is inserted onto the insert cone 310. Then, the mounting spring piece 320 is elastically deformed to elastically mount the disk 310 being inserted over the insert cone 310. At the same time, the clamp (not shown) presses the disk 'D' down on the turntable 130, thereby centering and mounting the disk.

Thereafter, when the turntable 130 is rotated by driving of the spindle motor 120, the disk 'D' is rotated. At this time, if there is a mass eccentricity on the disk itself, rotation unbalance is generated.

As the rotation unbalance occurs according to the mass eccentricity of the disk, the balls 230 traveling in the space 210 of the ball case gather at one side to correct the rotation unbalance.

In this respect, generally, in case that the disk is rotated in a vertical state, gravity force is applied to the ball 230, making it difficult for the ball 230 to move the position to correct the mass eccentricity of the disk.

However, in the present invention, since the inner racing face 210b has a bad asperity to increase a friction resistance with the ball 230, as shown in FIG. 9, the ball 230 contacts the inner racing face 210b to be raised up and quickly move to the position to correct the mass eccentricity.

Accordingly, as to the balancer having the auto balancing unit 200 and the mounting 300 of the present invention, in the state that the disk is stood up, even though the rotation unbalance is generated due to the mass eccentricity of the disk, the ball, overcoming the gravity force applied thereto, can be moved to the position to easily correct the rotation unbalance, so that the auto balancing is made quickly and without a noise. In addition, the disk can be accurately mounted on the mounting unit that has a simple construction.

For reference, an experiment result for the relationship between the surface asperity of the inner racing face 210b and the rotation number that the ball 230 is stabilized is shown hereinbelow.

In case that the asperity of the inner racing face 210b is 0.7µ, the rotation number band is 2500~3500 rpm. Generally, since the rotation number for reproducing an audio CD is 3000 rpm, it is desirable to form a surface asperity of the inner racing face 210b within the rotation number of 3000 rpm in order to stabilize the ball.

In addition, in case that the surface asperity of the inner racing face 210b is 10 µm, the rotation number band where the ball 230 is stabilized is 1000~16000 rpm. In this respect, the asperity of the outer racing face 210a is uniform and there is no variation for the vibration amount.

As so far described, according to the rotor balancer of the present invention, the construction of the mounting unit on the turntable for mounting the disk is simplified without requiring much space, which facilitates installation of the auto balancing unit.

In addition, the rotation unbalance of the rotor can be easily corrected, so that the problem of rotation unbalance of the disk generated in the disk driver when the drive is rotated at a high speed.

Moreover, since the rotation unbalance can be easily corrected simply by having different asperity on the inner racing face without requiring any additional components as well as simultaneously solving the noise and vibration problem, there is much effectiveness in view of its quality and unit cost.

Though the disk driver for recording and reproducing a signal on and from the disk such as a CD or a DVD is taken as an example in the above description, the rotor balancer can be used for various devices.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A rotor balancer for use in a disk drive, comprising:
   a rotor;
   a ball case provided at a turntable on which a disk is mountable, installed at the rotor and having a circular racing space, the circular racing space having at least two racing faces, wherein an inner racing face has a greater friction coefficient than that of an outer racing face; and a balancing member moving on the racing faces of the racing space to automatically correct unbalance caused when the rotor rotates, wherein the rotor comprises the turntable, and the turntable includes:

an insert unit which is insertable into a central hole of a disk; and a plurality of mounting spring pieces formed at the insert unit and made of an elastic material as well as having an elastic form so as to elastically support the disk when it is mounted on the turntable, so that the disk can be mounted accurately and firmly.

2. The rotor balancer according to claim 1, wherein the balancing member refers to a plurality of metallic balls.

3. The rotor balancer according to claim 1, wherein the rotor refers to a turntable on which a disk is mounted in a disk drive for recording/reproducing a signal on and from the disk.

4. The rotor balancer according to claim 1, wherein the rotor refers to a motor for providing power for rotating a disk in a disk drive for recording/reproducing a signal on and from the disk.

5. The rotor balancer according to claim 1, wherein the rotor refers to a damper for rotatably fixing a disk when the disk is mounted on a turntable in a disk drive for recording/reproducing a signal on and from the disk.

6. The rotor balancer according to claim 1, wherein the inner racing face is made of magnet.

7. The rotor balancer according to claim 1, wherein the insert unit is integrally formed with the turntable.

8. The rotor balancer according to claim 1, wherein the insert unit is formed separately from the turntable.

9. The rotor balancer according to claim 1, wherein the mounting spring pieces are formed around the insert unit.

10. A disk drive for recording or reproducing a signal on or from a disk comprising:

a rotor;

a rotor balancer including:

a ball case provided at a turntable on which a disk is mountable, installed at the rotor and having a circular racing space, the circular racing space having at least two racing faces, wherein an inner racing face has a greater friction coefficient than that of an outer racing face; and a balancing member moving on the racing faces of the racing space to automatically correct unbalance caused when the rotor rotates, wherein the rotor comprises the turntable, and the turntable includes:

an insert unit which is insertable into a central hole of a disk; and a plurality of mounting spring pieces formed at the insert unit and made of an elastic material as well as having an elastic form so as to elastically support the disk when it is mounted on the turntable, so that the disk can be mounted accurately and firmly.

11. The disk drive according to claim 10, wherein the insert unit is integrally formed with the turntable.

12. The disk drive according to claim 10, wherein the insert unit is formed separately from the turntable.

13. The disk drive according to claim 10, wherein the mounting spring pieces are formed around the insert unit.

14. An automatic balancing mechanism for use in a disk drive, comprising:

a ball case mounted to a rotational shaft, provided at a turntable on which a disk is mountable, the ball case including an outer racing face having a first asperity and an inner racing face made of a magnet and having a second asperity, wherein they are positioned concentric with the ball case, wherein the second asperity is greater than the first asperity; and a balancing member moveably accommodated in the ball case to provide balance during rotation of the rotational shaft, wherein the turntable is rotatable with the rotational shaft, and the turntable includes:

an insert unit which is insertable into a central hole of a disk; and a plurality of mounting spring pieces formed at the insert unit and made of an elastic material as well as having an elastic form so as to elastically support the disk when it is mounted on the turntable, so that the disk can be mounted accurately and firmly.

15. The automatic balancing mechanism according to claim 14, wherein the insert unit is integrally formed with the turntable.

16. The automatic balancing mechanism according to claim 14, wherein the insert unit is formed separately from the turntable.

17. The automatic balancing mechanism according to claim 14, wherein the mounting spring pieces are formed around the insert unit.

* * * * *